July 29, 1924.

F. J. ZIMMERMAN

APPARATUS FOR TESTING BATTERY JARS

Filed June 8, 1923

1,503,411

WITNESSES
Louis Goodman
Howard D. Orr.

F. J. Zimmerman
INVENTOR

BY

ATTORNEY

Patented July 29, 1924.

1,503,411

UNITED STATES PATENT OFFICE.

FRANK JACOB ZIMMERMAN, OF MODESTO, CALIFORNIA.

APPARATUS FOR TESTING BATTERY JARS.

Application filed June 8, 1923. Serial No. 644,289.

*To all whom it may concern:*

Be it known that I, FRANK J. ZIMMERMAN, a citizen of the United States, residing at Modesto, in the county of Stanislaus and State of California, have invented a new and useful Improvement in Apparatus for Testing Battery Jars, of which the following is a specification.

This invention relates to apparatus for testing battery jars.

The object is to provide a simple and efficient device for finding leaks in battery jars whether the same are located in an automobile or upon a work bench, the said device being easily and quickly applied in position and held by one hand of the operator and readily operated by the other hand, whereby leaks may be immediately detected by the forced discharge of the liquid contents thereof.

Another object is to provide a device of this character which may be manufactured and sold at a low cost and carried, if desired, in the tool kit of an automobile for quickly applying the same, there being no separate parts to become lost or misplaced, and it being so constructed as to be capable of use on batteries of different sizes and makes, the active end of the device being insertible through the filling opening of the battery, after the cap or closure for the same has been removed, and an air-tight connection maintained therewith by merely pressing by one hand while the other is employed in forcing air under pressure into the battery jars or casing to ascertain any leaks that may be present.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures.

Figure 1:
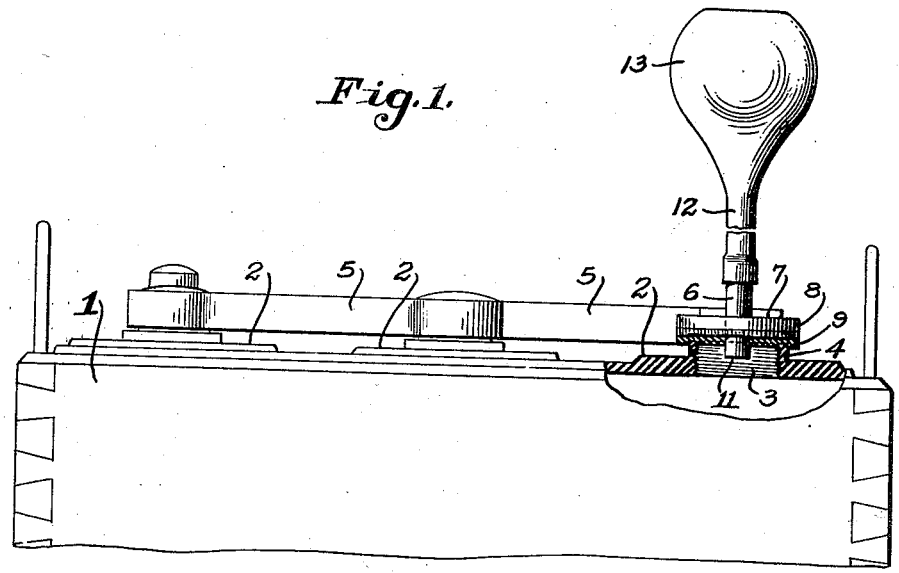
Figure 1 is a side elevation of the upper portion of an ordinary battery case in general use in automobiles, the same being partly broken away and having the improved testing device applied thereto.

In Figure 1, there is illustrated a portion of a battery casing 1 which is formed in the usual manner and contains the customary number of jars depending upon the size of the battery, there being shown three in the drawing, each having a cover plate 2 resting upon the top of the casing and being sealed around all openings or crevices with the usual application of sealing compound composed of wax and tar.

Each jar is equipped with a filling orifice 3 provided with a surrounding flange 4 and threaded internally for the reception of a suitable closure cap, and the said jars are connected in the usual manner by conductors 5 and equipped with terminal posts, which it is deemed not necessary to illustrate in the drawing.

In the rough usage to which such battery casings are subjected, while in use for automobile purposes, it often happens that leaks occur in the sealing compound around the covers of the jars and around the terminal posts, and it is ordinarily impossible to detect such leaks which are small, though large enough for the acid and water contained within the battery elements to escape therethrough during the travel of the automobile. Such leakage of the acid causes a quick deterioration of the battery and the casing and the same has often to be discarded.

By the periodical use of the improved testing device, such leaks may be found in time to prevent such deterioration, and the life of the battery may be materially prolonged, thus resulting in a great saving.

The invention comprises a tubular stem 6 of a size to be easily introduced into the filling orifice 3 of any sized battery. This tubular stem is preferably formed of some corrosion resisting metal, such as lead, so as not to be affected by the action of the acids contained within the batteries, and the said stem is provided adjacent to its lower end with an integral, outstanding lead disc or plate 7 provided with a marginal, downturned flange 8, the peripheral wall of which is of a diameter somewhat greater than the diameter of the upstanding flange 4 of the maximum sized filling opening of the jars.

Figure 2:
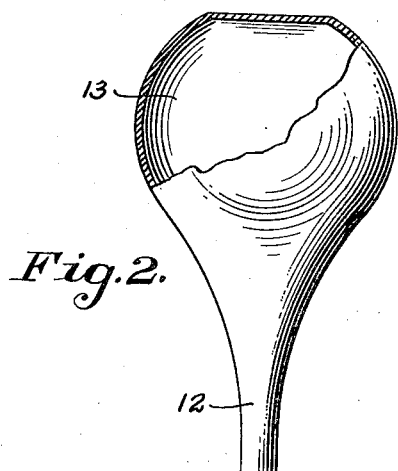
Figure 2 is an elevation, partly in section, of the device and drawn on a larger scale.
Figure 3:
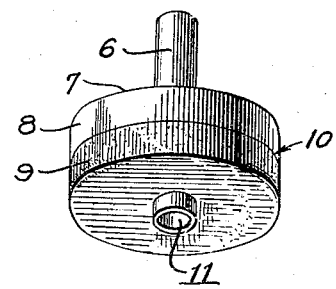
Figure 3 is a detail perspective view of that portion of the device which connects with the filling orifice of the battery.

A soft rubber gasket 9 of the same diameter as the flange 8 is fitted within the latter and bears against the underside of the disc or plate 7, the lower marginal edge 10 of the depending flange 8 being turned inwardly to impinge the rubber gasket and securely hold the same in connection with the disc. When the gasket is thus applied, the lower end of the stem 6 extends below the surface thereof, and the upper end of said stem is considerably longer and is adapted to receive the elongated neck 12 of a rubber bulb 13, which is entirely closed except where communicating with said neck. The lower free end of the neck is stretched over the upper end of the stem 6, as clearly shown in Figure 2 of the drawing.

By applying the device in the manner illustrated in Figure 1, it will be seen that pressure upon the bulb 13 will cause the air contained therein to be forced through the stem 6, while pressure by the other hand of the operator upon the upper face of the disc 7 will form a tight joint between the rubber gasket and the flange 4, whereupon the liquid within the battery will be forced through any leak that may be present and immediately detected by the operator. It will be observed that the tubular stem 6 is connected directly to the lower end of the neck 12 of the rubber bulb, the intention being to handle the device by engaging the bulb. The disk 7, with the stem 6 and the rubber gasket 9 form a light structure which will not impose any material weight on the connection between the stem and the neck of the bulb. By reason of this specific construction, the device constitutes a removable unit which may be applied and removed from the orifice of the battery jar simply by grasping the bulb. So far as I am aware, I am the first to provide a simple means applicable to the filling orifice of a battery jar for testing the same.

From the foregoing it will be seen that a simple device has been provided which may be easily applied and operated for the detection of leaks in batteries, or for other similar purposes, the same being adapted for use in openings of different sizes, and that a tight joint may be readily maintained around the said opening while the device is in use.

What is claimed is:—

1. A testing device for application to the filling orifice of a battery jar, comprising a compressible bulb, a closing and sealing means to span and make a tight joint with said orifice, and a tubular connection between said means and said bulb, said connection discharging beneath said closing and sealing means, the whole forming a light structure which may be applied and removed as a unit to said orifice by grasping the bulb.

2. A battery testing device comprising a tubular, metallic stem, an outstanding disc carried by the stem intermediate the ends thereof, the peripheral edge of the disc having a depending flange, a resilient gasket of equal diameter with and fitted beneath the disc and within the said flange, a marginal, inturned bead carried by the flange and adapted to impinge the gasket to retain the same in position, and a rubber bulb having a tubular neck directly connected to the upper end of the stem for forcing air through the same.

3. In a device for testing leaks in batteries or the like, a tubular stem formed of non-corrosive metal, an integral, concentric disc carried thereby adjacent to the lower end of the same, a soft rubber gasket located beneath the disc, a flange of less thickness than the gasket depending from the periphery of the disc and having its lower edge inturned to impinge and retain the gasket, a compressible bulb having a hollow neck directly connected to the upper end of the stem to force air through the stem after the same has been introduced into the filling opening of the battery, with the lower end of the tube extending into the opening and the gasket held in compressed, air-tight relation to said opening.

4. A testing device for application to the filling orifice of a battery jar, comprising a compressible bulb having an elongated neck, a tubular stem open at both ends, a relatively thin metal disk fixed to the stem above the lower end, a rubber gasket secured to the underside of said disk about said stem, said disk and gasket being of a greater diameter than said orifice so as to span the same and be held thereon by hand pressure, and said gasket being of greater thickness than the disk said stem being connected to the neck of said bulb, whereby the bulb, stem, disk and gasket constitute a unit which may be applied and removed from said orifice.

In testimony that I claim the foregoing as my own, I have hereto affixed my signature.

FRANK JACOB ZIMMERMAN.